(12) United States Patent
Riach (10) Patent No.: US 7,573,528 B1
(45) Date of Patent: ***Aug. 11, 2009

(54) METHOD AND APPARATUS FOR DISPLAYING PROGRESSIVE MATERIAL ON AN INTERLACED DEVICE

(75) Inventor: Duncan Andrew Riach, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 722 days.

This patent is subject to a terminal disclaimer.

(21) Appl. No.: 11/282,212

(22) Filed: Nov. 18, 2005

Related U.S. Application Data (63) Continuation of application No. 10/014,003, filed on Dec. 6, 2001, now Pat. No. 7,015,970.

(51) Int. Cl.
*H04N 11/00* (2006.01)

(52) U.S. Cl. .................. 348/446; 348/458

(58) Field of Classification Search ............ 348/446, 348/447, 458, 581; 345/603, 660, 667, 698, 345/699, 506
See application file for complete search history.

(56) References Cited

U.S. PATENT DOCUMENTS

| | | | |
|---|---|---|---|
| 5,796,442 A | 8/1998 | Gove et al. | |
| 5,815,208 A | 9/1998 | Samela et al. | |
| 5,828,415 A | 10/1998 | Keating et al. | |
| 5,910,820 A | 6/1999 | Herz et al. | |
| 6,141,055 A * | 10/2000 | Li | 348/446 |
| 6,147,712 A * | 11/2000 | Shimamoto et al. | 348/446 |
| 6,226,040 B1 | 5/2001 | Kuo et al. | |
| 6,727,958 B1 | 4/2004 | Shyu | |
| 2002/0018144 A1 | 2/2002 | Ueki | |
| 2002/0101535 A1 | 8/2002 | Swan | |

* cited by examiner

*Primary Examiner*—Victor R Kostak
(74) *Attorney, Agent, or Firm*—Cooley Godward Kronish LLP (57) ABSTRACT

A method and apparatus are provided for displaying progressive material on an interlaced display where the number of lines of the source frame is equal to or less than the number of lines in a display field, where such lines in the display field are derived from all of the lines of the source frame.

20 Claims, 7 Drawing Sheets

INVENTION (VIRTUAL PROGRESSIVE MODE)
LINES IN SOURCE FRAME LESS THAN LINES IN DISPLAY FIELD

METHOD AND APPARATUS FOR DISPLAYING PROGRESSIVE MATERIAL ON AN INTERLACED DEVICE

CROSS REFERENCE TO RELATED APPLICATIONS

This application is a continuation application of U.S. patent application Ser. No. 10/014,003 entitled, "Method and Apparatus For Displaying Progressive Material on an Interlaced Device," filed on Dec. 6, 2001, now U.S. Pat. No. 7,015,970 the contents of which is hereby incorporated by reference in its' entirety.

FIELD OF THE INVENTION

The present invention relates to interlacing methods, and more particularly to improving interlacing in a graphics pipeline.

BACKGROUND OF THE INVENTION

Computer displays and televisions are known to utilize different display techniques; computer displays utilize a progressive non-interlaced display technique, while televisions utilize an interlaced technique. The progressive display technique creates frames for displaying wherein each frame includes complete pixel information for the display. For example, if the computer display is a 640×480 pixel display, each line of a frame would include the appropriate pixel information for display. Thus, each frame display, which is done at a refresh rate of the computer display (e.g., 60 hertz, 75 hertz, 90 hertz, etc.), is complete. Because each frame contains complete pixel information, no human perception filtering is required.

The interlaced technique has two types of fields: top fields and bottom fields. Top fields and bottom fields are also known as odd and even fields. A top field contains only the pixel information for odd lines of the frame, while the bottom field contains only pixel information for even lines of the frame. As such, both fields are incomplete. When displayed at the refresh rate of the television, which may be approximately 60 hertz in North America, the fields are presented at a rate of 30 top fields and 30 bottom fields per second. Because the interlaced display technique alternates between top fields and bottom fields, the human visual process filters the fields such that complete images (i.e. frames) are perceived by the viewer.

Figure 1:
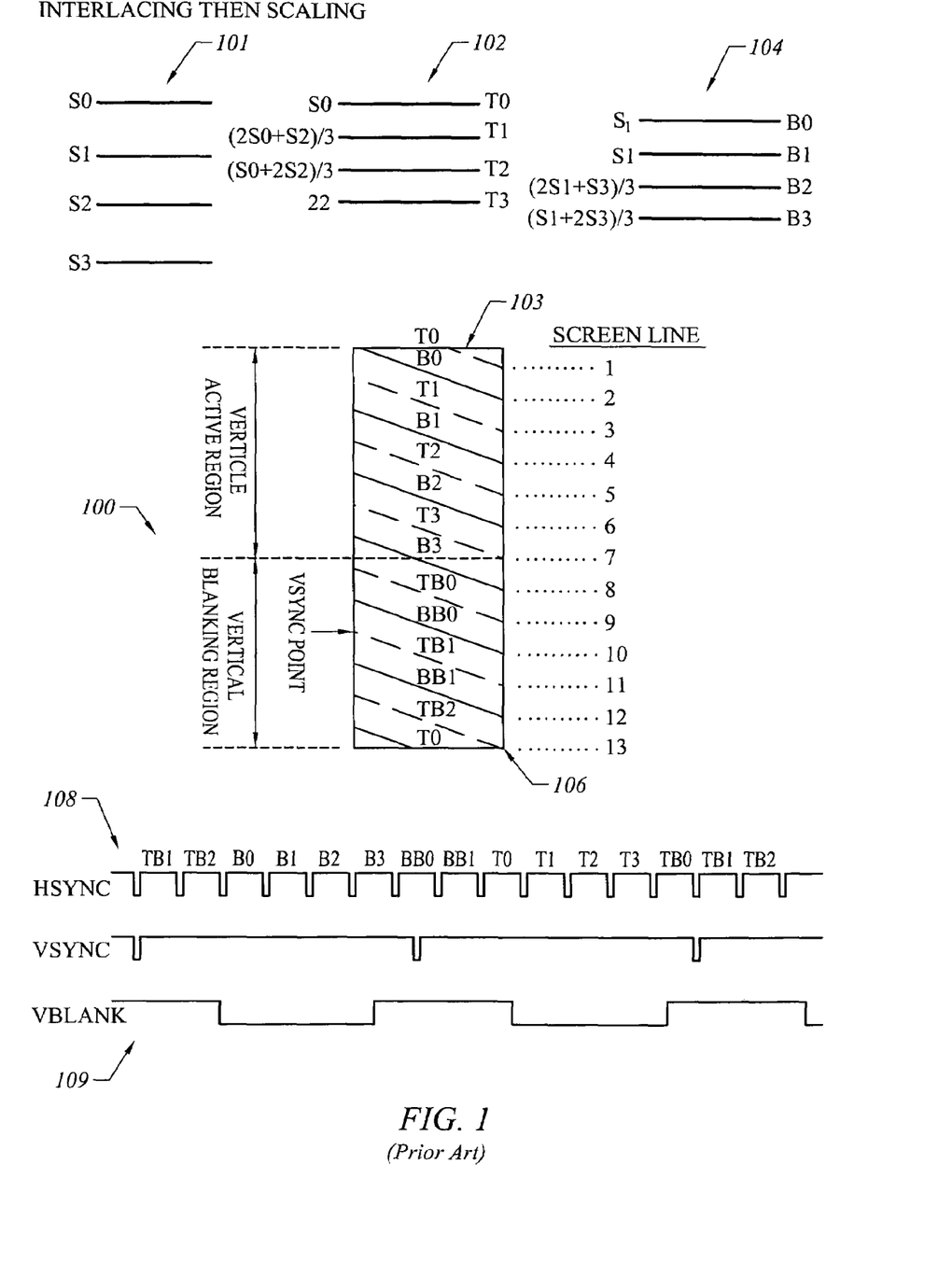
FIG. 1 illustrates the manner in which the interlaced technique operates.

Prior Art FIG. 1 illustrates the manner 100 in which the interlaced technique operates. Initially, pixel information for a plurality of source lines $S_0, S_1, S_2, S_3$, etc. of a source frame 101 is provided. From the source lines, a top field 102 of lines $T_0, T_1, T_2, T_3$, etc. is extracted along with a bottom field 104 of lines $B_0, B_1, B_2, B_3$, etc. for display on a destination frame 103.

As shown in Prior Art FIG. 1, $T_0$ and $T_3$ are copies of $S_0$ and $S_2$. Further, scaling is done to generate $T_1$ and $T_2$ from $S_0$ and $S_2$. Such scaling is accomplished by interpolation utilizing the equations shown. It should be noted that scaling is often used when it is desired to display a first number of source lines on a destination frame with a second number of lines greater than the first number. Similar to the top field 102, the scaling operation may also be performed on the bottom field 104.

With the source lines $S_0, S_1, S_2, S_3$, etc. scaled and the top field lines $T_0, T_1, T_2, T_3$, etc. and bottom field lines $B_0, B_1, B_2, B_3$, etc. generated, the top and bottom fields are adapted to be depicted in a destination frame 103 on an output device 106.

As set forth in FIG. 1, a raster scanout pattern of a destination frame 103 is shown to contain both top and bottom fields and a vertical blanking region. In particular, the top field lines $T_0, T_1, T_2, T_3$, etc. and bottom field lines $B_0, B_1, B_2, B_3$, etc. are projected on the destination frame 103 in accordance with sync waveforms 108. Such corresponding horizontal and vertical sync waveforms 108 are shown with a vertical blanking waveform 109, to show where the active lines are in the fields.

Table #1 illustrates various parameters used for the display configuration shown in FIG. 1.

TABLE #1

TOTAL LINES IN DISPLAY FRAME: 13 (ODD NUMBER)
TOTAL LINES IN DISPLAY FIELD: 6.5
ACTIVE LINES IN DISPLAY FRAME: 8
ACTIVE LINES IN DISPLAY FIELD: 4
LINES IN BLANKING PERIOD: 3

Unfortunately, if flicker filtering is not employed, interlacing results in aliasing which is different in the two fields. This results in flickering.

Figure 1A:
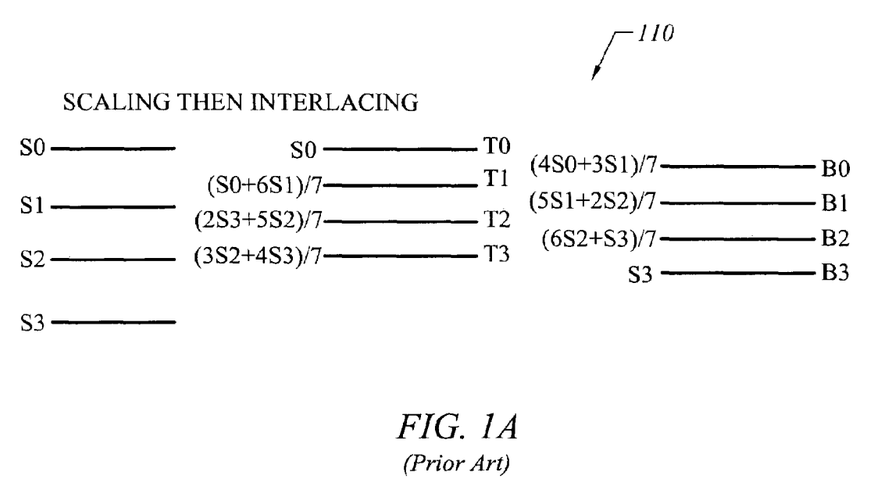
FIG. 1A illustrates an alternate technique for generating the active lines of FIG. 1 from a source frame.

Prior Art FIG. 1A illustrates an alternate technique 110 for generating the active lines of FIG. 1 from a source frame. In such alternate technique, scaling precedes interlacing, unlike the embodiment of FIG. 1. Unfortunately, a filter used to reconstruct the new lines prior to interlacing is typically a poor anti-aliasing filter. Subsequently, the interlacing results in aliasing, which is different in the two fields, resulting again in flicker.

During both techniques for generating active lines from a source frame (FIGS. 1 and 1A), the source frame can unfortunately only be changed once every two field scanout periods, if all of the information in the source frame is to be displayed since the source frame is used to generate both display fields. This restricts the frame animation rate to one half of the field display rate.

It should be noted that it is still possible to animate the source frames at a field scanout rate. To accomplish this, the top or bottom lines may be extracted as appropriate, as shown in the foregoing figures. The problem, however, is that only half the source frame information gets displayed.

DISCLOSURE OF THE INVENTION

A method and apparatus are provided for displaying progressive material on an interlaced display where the number of lines of the source frame is equal to or less than the number of lines in a display field (i.e. top field or bottom field) of a destination frame, where such lines in the display field are derived from all of the lines of the source frame.

The present technique may be viewed and termed in various ways. For example, another method and apparatus are also provided for use during graphics processing. Initially, a source frame is identified including a plurality of lines. Then, a top field of a destination frame is populated with the lines, and a bottom field of the destination frame is populated with the lines. Such lines populating the top field and the bottom field are the same.

In terms of another example, a method and apparatus are provided where a source frame is initially provided including a plurality of lines. A top field of a destination frame of an output device is then populated with both the top lines and the bottom lines. Moreover, a bottom field of the destination frame is populated with both the top lines and the bottom lines.

As an option, the source frame may be scaled. Such scaling produces additional lines that are each utilized to populate the fields of the destination frame.

In one embodiment, the output device may include a high-definition television. As an option, the lines may be sent to a digital-to-analog converter to populate the fields of the destination frame. Sync waveforms may also be sent to the digital-to-analog converter for populating the fields of the destination frame. It should be noted that the lines, and the sync waveforms may also be sent directly to a destination frame capable of handling such information.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

Prior Art

Prior Art

DESCRIPTION OF THE PREFERRED EMBODIMENTS

Figure 2:
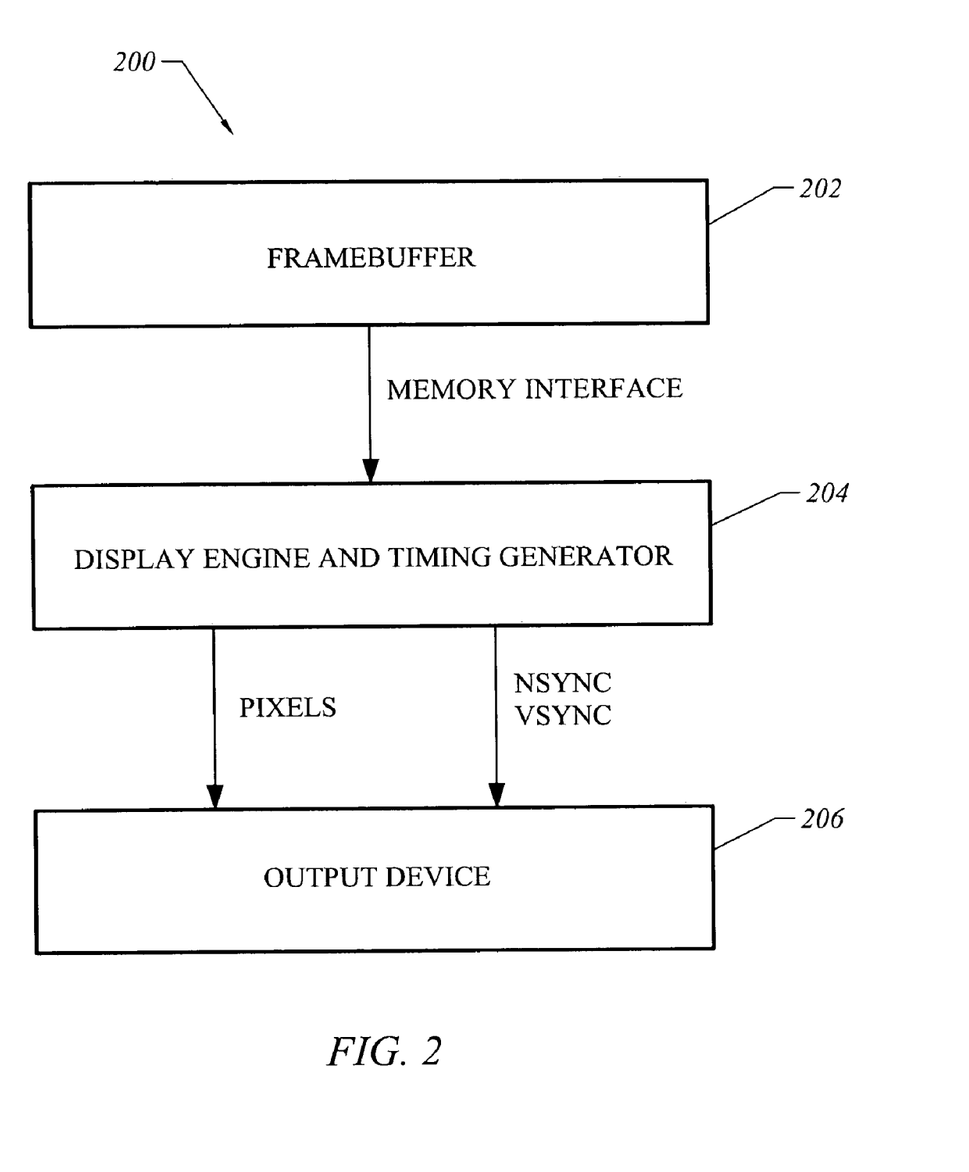
FIG. 2 illustrates a schematic diagram showing an exemplary architecture, in accordance with one embodiment.

FIG. 1 illustrates the prior art. FIG. 2 illustrates a schematic diagram showing an exemplary architecture 200, in accordance with one embodiment. As shown, a frame buffer 202 is provided for storing source frames. As is well known, such source frames may be the product of a graphics pipeline of a progressive display system. Further, the graphics pipeline may be equipped with transform, lighting, and/or rendering capabilities. It should be noted, however, that the source frames may be produced in any desired manner.

Coupled to the frame buffer 202 is a display engine 204. Such display engine 204 is capable of reading the source frames from the frame buffer 202. The source frames include a plurality of lines. As an option, the display engine 204 may further be capable of scaling the source frames to increase or decrease the number of lines. This technique is often useful when attempting to fit source frames of a first size on a display equipped to depict images of a second size.

The display engine 204 thus makes available a plurality of lines for output to a subsequent device. Such lines originate from the source frames and can be manipulated, i.e. scaled, in any desired manner.

In the context of the present invention, the source frame may include any derivation of the source frames, component of the source frames, the source frames themselves, or any other related information capable of being displayed. Moreover, the lines may include top and bottom lines which refer to any two subsets of lines associated with the source frame. For example, such top and bottom lines may refer to even and odd lines. In other words, the top and bottom lines include all (or at least a majority) of the lines of the associated source frame.

Associated with the display engine 204 is a timing generator that controls the output of the lines. In particular, the timing generator produces control signals in the form of sync waveforms that indicate when the particular lines should be output. As shown in FIG. 2, the display engine 204 outputs such control signals along with a stream of pixels indicative of the top and bottom lines.

Coupled to the display engine 204 is an output device 206. Such output device 206 may include a display device such as a television, high-definition television (HDTV), or any other device capable of receiving or displaying an output frame or field. Moreover, the output device 206 may include an analog-to-digital (A/D) converter. It should be noted that such A/D converter may be a stand alone device or incorporated in a display device.

Figure 3:
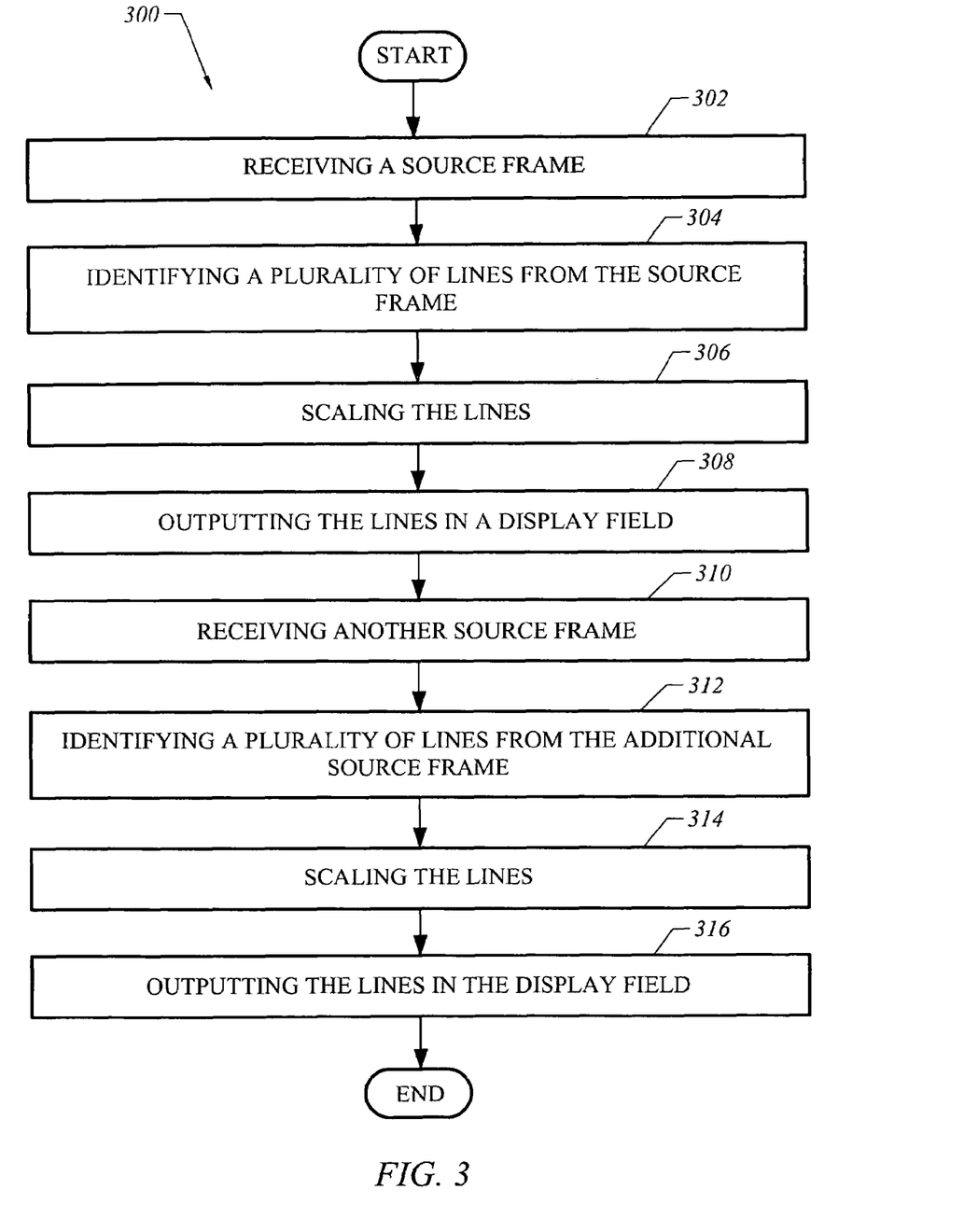
FIG. 3 illustrates a de-interlacing method for use during graphics processing, in accordance with one embodiment.

FIG. 3 illustrates a de-interlacing method 300 for use during graphics processing, in accordance with one embodiment. As an option, the method 300 may be implemented in the context of the architecture 200 of FIG. 2. Of course, however, the present method 300 may be implemented in the context of any desired architecture. For example, the specific exemplary architecture of FIG. 5 may be utilized, and so on.

As shown in FIG. 3, a source frame is initially received in operation 302. As mentioned earlier, the source frame may be received from a frame buffer 202, or any desired source. Utilizing the display engine 204 or a similar device, a plurality of lines (i.e. top and bottom lines) are identified from the source frame. Note operation 304.

Next, in operation 306, the lines are scaled. In a case where the lines are scaled to include additional lines, interpolation may be used to generate the additional lines via "upscaling." Such interpolation is thus useful when attempting to fit a source frame of a small size on a display equipped to depict images of a larger size.

In operation 308, the lines are outputted for being displayed in a top field of a destination frame of a display. Such destination frame may include any processed and/or outputted frame.

In a similar manner, another (i.e., a second) source frame may be retrieved in operation 310, and all of the lines (i.e. top and bottom) may again be identified and scaled in operations 312 and 314. Thus, the lines are outputted for being displayed in a bottom field of a destination frame of the display. Note operation 316.

During operations 304 and 312, it is important (to get the full benefit of the technique) that the number of lines of the source frame that are identified and used is equal to or less than the number of lines in a display field (i.e. top field or bottom field) associated with the destination frame of the output device. Moreover, such lines in the display field are derived from (i.e. based at least in part on) all of the lines of the source frame. In other words, all of the lines of the source frame are used when generating the lines in the display field. A pictorial example will be set forth during reference to FIG. 4 which will further illustrate this feature.

By this method 300, the source frame is inherently upscaled by a factor of two (2). This is of particular benefit when the source frames have a resolution that is much less than the resolution of a destination frame of the output device. Further, flickering and aliasing are eliminated. More advantages will be set forth hereinafter in greater detail.

In another embodiment, the top field of the destination frame is populated with certain lines from the source frame, and the bottom field of the destination frame is populated with the same lines in operations 308 and 316. In other words, the lines identified, scaled and used to populate both of the fields in operations 304-308, and 312-316 are the same.

In still another embodiment, both the top and bottom field of the destination frame may be populated with both the top and bottom lines or, in other words, all of the lines of the source frame. This is the case, for example, if the source frame is not changed for two field scanout periods. It should be noted that the top and bottom lines refer to any two subsets of lines associated with the source frame. For example, such top and bottom lines may refer to even and odd lines. In other words, the top and bottom lines include all (or at least a majority) of the lines of the associated source frame.

Figure 4:
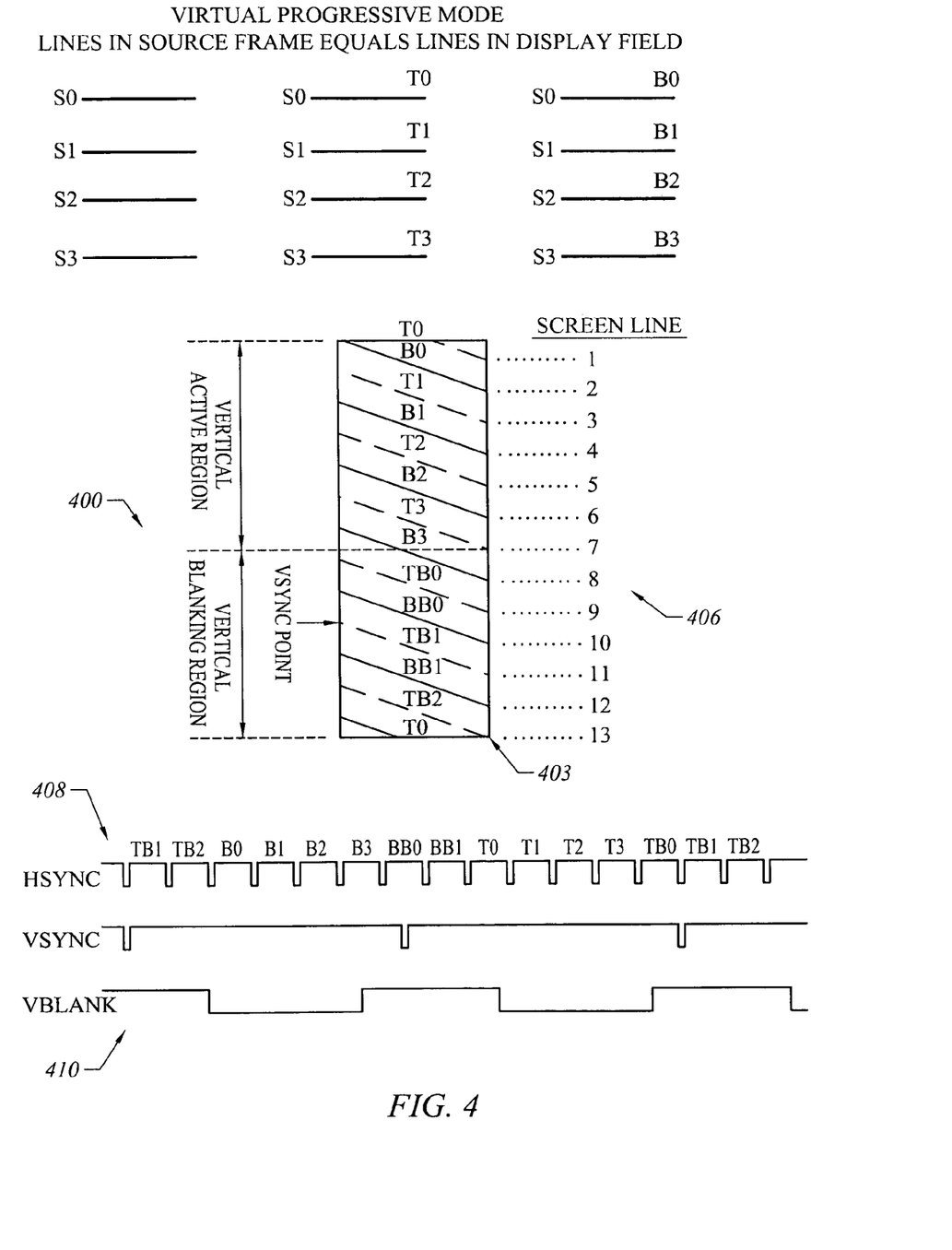
FIG. 4 illustrates an example of the method set forth in FIG. 3.

FIG. 4 illustrates an example 400 of the method 300 set forth in FIG. 3. Initially, pixel information for a plurality of source lines $S_0$, $S_1$, $S_2$, $S_3$, etc. of a source frame is received, as indicated in operations 302 and 310. From the source lines $S_0$, $S_1$, $S_2$, $S_3$, etc., top lines $T_0$, $T_1$, $T_2$, $T_3$, etc. are extracted along with bottom lines $B_0$, $B_1$, $B_2$, $B_3$, etc.

Again, it is important (to get the full benefit of the technique) that the number of lines of the source frame that are identified and used is equal to or less than the number of lines in a display field (i.e. top field or bottom field) associated with the destination frame of the output device. Moreover, such lines in the display field are derived from all of the lines of the source frame. Of course, this technique may be termed in various other ways set forth hereinabove. It is possible to apply this technique where the number of source frame lines is less than the number of displayed field lines but it may require downscaling of the source frame vertically which results in a loss of information. This technique provides the benefit of removing flicker.

With the top lines $T_0$, $T_1$, $T_2$, $T_3$, etc. and bottom lines $B_0$, $B_1$, $B_2$, $B_3$, etc. generated, the top and bottom lines are ready to be depicted on a destination frame 403 of an output device 406. In use, the top field lines $T_0$, $T_1$, $T_2$, $T_3$, etc. and bottom field lines $B_0$, $B_1$, $B_2$, $B_3$, etc. are projected on the destination frame 403 in accordance with horizontal and vertical sync waveforms 408 as well as a vertical blanking waveform 410, to show where the active lines are in the fields.

Figure 4A:
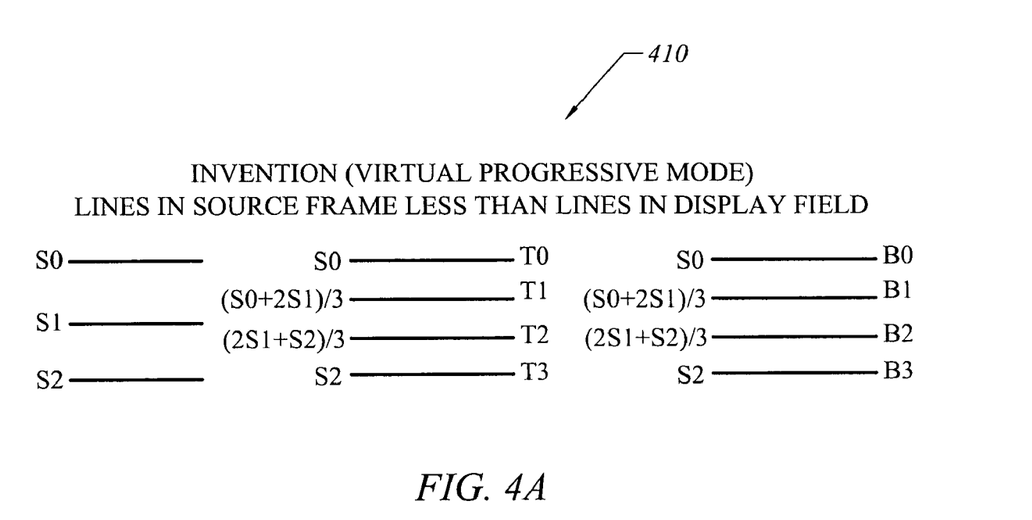
FIG. 4A illustrates an alternate technique for generating the active lines of FIG. 4 from a source frame.

FIG. 4A illustrates an alternate technique 411 for generating the active lines of FIG. 4 from the source frame. As shown in FIG. 4A, $T_0$ and $T_3$ are copies of $S_0$ and $S_2$. Further, scaling is done to generate $T_1$ and $T_2$ from $S_0$-$S_2$. Such scaling is accomplished by interpolation utilizing the equations shown. Similar to the top lines $T_0$, $T_1$, $T_2$, $T_3$, etc., the scaling operation may also be performed on the bottom lines $B_0$, $B_1$, $B_2$, $B_3$, etc. Note operations 306 and 314 of FIG. 3.

By this design, the source frame is vertically upscaled by a factor of 4/3 by the foregoing process. Further, flickering and aliasing are eliminated since the present technique is not affected by movement differences between the top and bottom fields of the source frame, because the whole source frame is sent to the display device at once. No flicker filtering is thus required. Still yet, the present system appears to be a progressive display to software and other systems. Yet another advantage involves the capability of animating at the field scanout rate, without the loss of any information.

Figure 5:
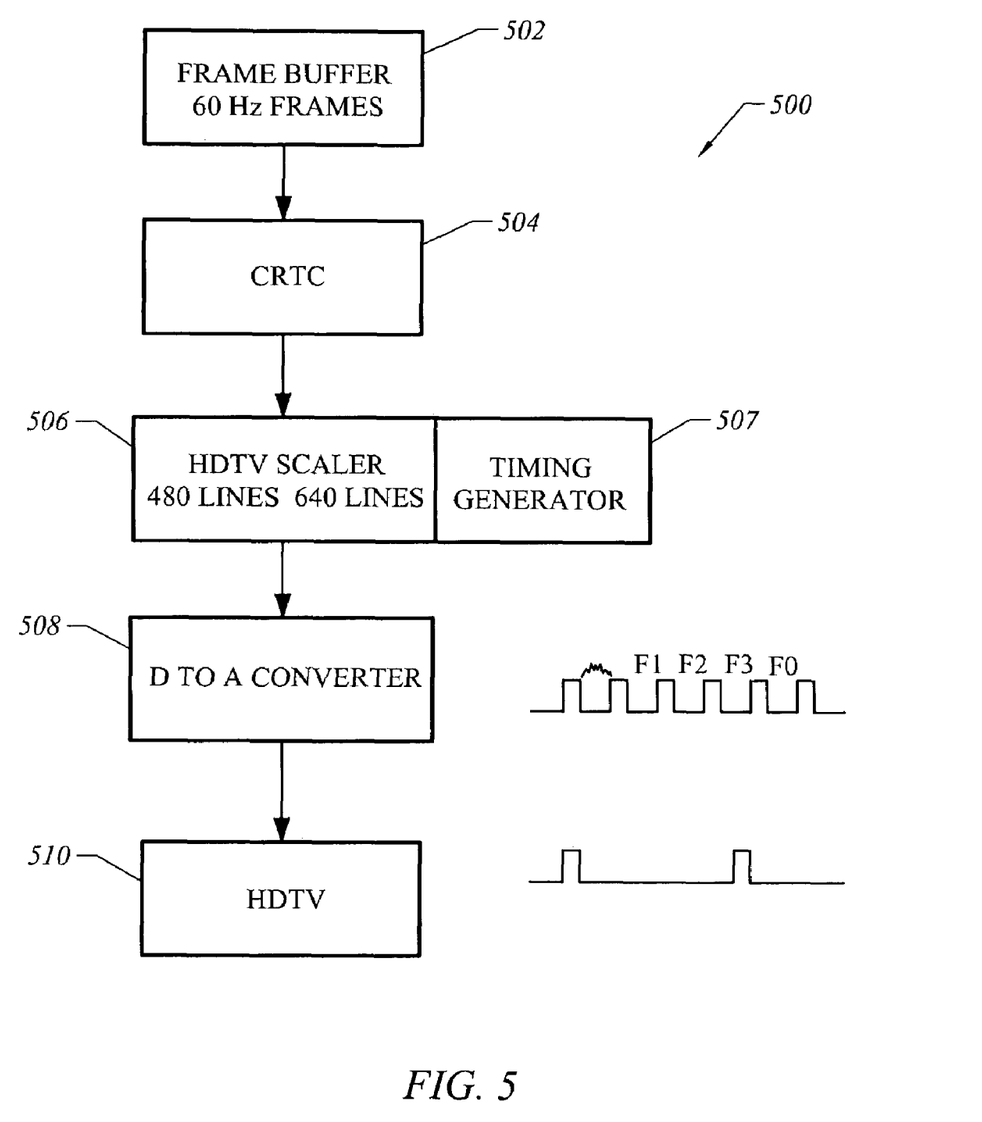
FIG. 5 illustrates a schematic diagram showing an exemplary architecture, in accordance with another embodiment.

FIG. 5 illustrates a schematic diagram showing an exemplary architecture 500, in accordance with another embodiment. As shown, a frame buffer 502 is provided for storing source frames. Coupled to the frame buffer 502 is a cathode ray tube controller (CRTC) 504 for reading the source frames therefrom.

Also included is a high definition television (HDTV) scaler 506 coupled to the CRTC 504. Such HDTV scaler 506 is capable of scaling the source frames to increase the number of top and bottom lines. This technique is necessary to fit the source frames in HDTV format. In one example, the present embodiment may be used to upscale a 640×480 source frame to be suitable for display on a destination field with dimensions of 1920×540.

Associated with the HDTV scaler 506 is a timing generator 507 that controls the output of the top and bottom lines. In particular, the timing generator produces control signals in the form of sync waveforms that indicate when the particular lines should be outputted.

As shown in FIG. 5, the timing generator 507 outputs such control signals along with image information to an analog-to-digital (A/D) converter 508. The A/D converter 508 converts the image information to an analog format suitable for being displayed using a HDTV 510 coupled to the A/D converter 508.

While various embodiments have been described above, it may be understood that they have been presented by way of example only, and not limitation. Thus, the breadth and scope of a preferred embodiment may not be limited by any of the above described exemplary embodiments, but may be defined only in accordance with the following claims and their equivalents.

What is claimed is:

1. A display engine for displaying progressive material on an interlaced display, comprising:

logic configured to read a source frame having a plurality of top lines and a plurality of bottom lines and in response populate a display field of a destination frame of an output device with both the top lines and the bottom lines, wherein the number of lines of each source frame is equal to or less than the number of lines of the display field of the destination frame, and the lines of the display field are derived from all of the lines of the source frame.

2. The display engine as recited in claim 1, wherein the source frame is inherently upscaled by a factor of two.

3. The display engine as recited in claim 1, wherein the source frame is scaled to a high definition television (HDTV) format.

4. The display engine as recited in claim 1, wherein flickering is eliminated.

5. The display engine as recited in claim 1, wherein said display engine reads source frames generated by a graphics pipeline.

6. The display engine as recited in claim 1, wherein said display engine reads source frames from a frame buffer.

7. The display engine of claim 1, wherein said display engine outputs timing control signals indicative of when particular lines should be output.

8. The display engine of claim 7, wherein said display engine outputs a stream of pixels indicative of the top lines and the bottom lines.

9. A display engine to convert progressive material to an interlaced output, comprising;

(a) logic for reading a source frame including a plurality of top lines and a plurality of bottom lines; and (b) logic for populating a display field of a destination frame of an output device with both the top lines and the bottom lines;

(c) wherein the number of lines of the source frame is equal to or less than the number of lines of the display field of the destination frame, and the lines of the display field of the destination frame are derived from all of the lines of the source frame.

10. The display engine as recited in claim 9, wherein said display engine reads source frames generated by a graphics pipeline.

11. The display engine as recited in claim 9, wherein said display engine reads source frames from a frame buffer.

12. The display engine as recited in claim 9, wherein said display engine performs a scaling operation to scale said source frame to a high definition television (HDTV) format.

13. The display engine as recited in claim 9, wherein the source frame is inherently upscaled by a factor of two.

14. The display engine as recited in claim 9, wherein flickering is eliminated.

15. The display engine of claim 9, wherein said display engine outputs timing control signals indicative of when particular lines should be output.

16. The display engine of claim 15, wherein said display engine outputs a stream of pixels indicative of the top lines and the bottom lines.

17. An interlacing method, comprising;
 (a) reading a source frame including a plurality of top lines and a plurality of bottom lines; and
 (b) populating a display field of a destination frame of an output device with both the top lines and the bottom lines;
 (c) wherein the number of lines of the source frame is equal to or less than the number of lines of the display field of the destination frame, and the lines of the display field of the destination frame are derived from all of the lines of the source frame.

18. The method of claim 17, wherein said reading comprises reading a frame buffer.

19. The method of claim 18, further comprising: utilizing a graphics pipeline to generate source frames stored in said frame buffer.

20. The method of claim 17, further comprising: performing scaling to scale said source frame to a high definition television format.

* * * * *